Oct. 13, 1931.  E. B. CARNS  1,827,281

WING OR PLANE FOR AIRCRAFT

Filed July 21, 1927

Inventor,
Edmund B. Carns.
By his Attorneys,
Hoguet & Neary.

Patented Oct. 13, 1931

1,827,281

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

WING OR PLANE FOR AIRCRAFT

Application filed July 21, 1927. Serial No. 207,345.

My invention relates to improvements in wings or plants for aircraft and the object of my invention is to produce a wing which under certain conditions will flex or yield slightly to meet an abnormal strain and to prevent disruption or distortion of any of the wing parts. Under certain conditions abnormal strains are placed upon the wing or plane of an aircraft, usually on the under surface but sometimes on the top surface which are so sudden and abnormal as to disrupt the surface or cover of the wing and break or distort some of the wing structure. For example, if an airplane has taken a long dive and is brought suddenly into a position of equilibrium, the pressure on the under part of the wing is so great and sudden that before the strains can be distributed and absorbed, parts of the wing may be even broken or distorted. This is less likely to occur on the upper side of the plane but it may under certain conditions. My invention is intended to produce a plane which will successfully meet these conditions and in a manner that will be simple, reliable and not too expensive. If the wing structure is made in any usual way to resist any such abnormal conditions, it means that the wing must be made too heavy for ordinary purposes or normal conditions, or else made in an expensive manner.

My invention is intended to produce a wing which under any normal conditions will be as rigid as is desirable but which under abnormal conditions such as that referred to will flex or yield before a breaking point is reached and so give the wing opportunity to absorb and distribute the abnormal shock. The details of the wing construction are unimportant in so far as my invention is concerned, but I preferably arrange any desired form of wing with sections which are hinged so that they may yield slightly with respect to each other under an abnormal strain, but to confine the sections so that they do not yield except when the peculiar conditions noted obtain. This will be better understood from the description which follows.

Reference is to be had to the accompanying drawings in which similar reference characters represent the corresponding parts in all views.

Figure 1:
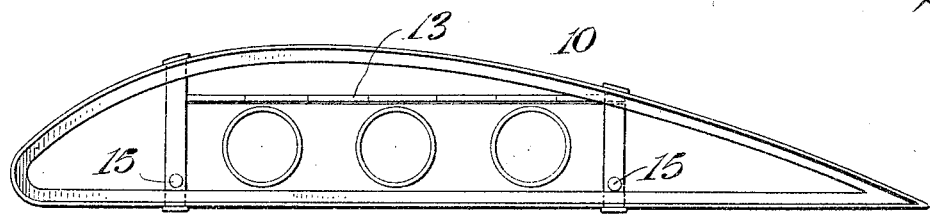
Figure 1 is a cross section of a typical wing for aircraft.
Figure 2:
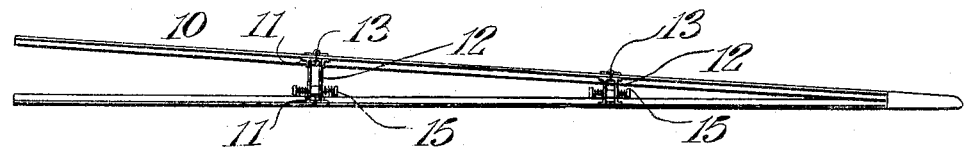
Figure 2 is a broken longitudinal section thereof.
Figure 3:
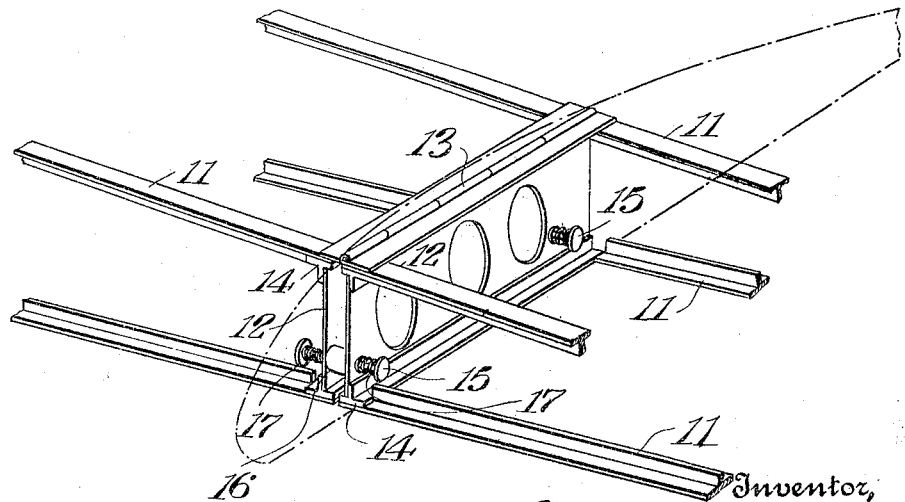
Figure 3 is a fragmentary perspective enlargement showing how adjacent wing sections can be yieldingly connected.

So far as my invention is concerned, the wing 10 can be of any approved or preferred construction and for the purpose of the invention I have shown it provided with longitudinal upper and lower spaced members 11 which may be parts of the wing spars or otherwise, and at desired intervals the sections are provided with spaced opposed abutments or bulkheads 12 which extend transversely of the members 11 and come beneath and slightly offset from the hinge 13 which connects adjacent wing sections and which is preferably at the top. To stiffen the sections at the hinged points, cross ribs 14 can be placed at the upper and lower parts of the wing and between the members 11 or equivalent supports. These members are spaced slightly with respect to each other so as to provide a little but not too much clearance to permit a slight hinge movement. The bulkheads afford also a convenient and effective means of resiliently connecting the aforesaid wing sections. For example headed pins 15 may extend through the bulkheads and protrude from opposite sides, the pins extending also through spacing blocks 16 which can be of rubber and therefore resilient or stiff springs can be substituted. On the opposite sides of the bulkheads 12 are springs 17 which are coiled around the pins and lie between the pin heads and aforesaid bulkheads. The springs 17 and the cushion are calibrated so that under normal conditions the wing will be substantially rigid but the strength of the spring is such that before any break or disrupting or distorting strain on the wing is reached the springs will yield to permit the wing sections to swing to a limited extent on the hinge 13 and thus the momentary yielding will permit the excessive shock to be absorbed and distributed; and immediately after the tension of the spring or cushion will restore the wing parts to normal relation which would be precisely like that of a conventional wing.

It will be readily seen by one skilled in this art that while I have shown a simple and preferred means of carrying out my invention, that it is feasible and entirely practical to hinge the wing sections in a great variety of ways and to provide the yielding cushions or springs in consonance with the idea of the invention without affecting the principle of the invention. The particular manner in which the wing sections are hinged and the limited yielding parts disposed will obviously depend to a great extend on the wing construction generally, but with most wings the arrangement which I have shown is readily applicable. It will be noticed that with this construction the wing need not be made abnormally strong or expensive, but only sufficiently strong to meet normal conditions and that when the abnormal shocks occur such shocks and consequent strains will be absorbed and distributed without damage to the machine.

I claim:

1. A wing for aircraft having sections hinged together near the top, opposed abutments on the aforesaid sections, limiting pins extending through the abutments, and tension cushions to limit the movement of the abutments and the wing sections of which they form a part.

2. A wing for aircraft comprising sections hingedly connected together, means within said sections normally holding each section against flexing, said means being independently yieldable under conditions of abnormal stress and a second means adapted to limit the flexing to a relatively slight movement.

3. A wing for aircraft comprising substantially transverse sections hinged together, yielding means within said sections normally holding each section independently against flexing and means for limiting the hinged action to a relatively slight movement.

4. A wing for aircraft comprising a pair of sections hinged together, an abutment rigidly secured to each section and a yielding element between said abutments for the purpose specified.

5. A wing for aircraft comprising sections hinged together, a bulkhead rigidly secured to each section and yieldable means within said sections normally holding said bulkheads in a normally fixed position to support said wings yieldably in their normal flying position, said means having relatively yieldable movement.

6. A wing for aircraft comprising sections hinged together, a bulkhead rigidly secured to each section and yieldable means between said sections normally holding said bulkheads in parallel relationship to yieldably maintain said wings in their flying positon, said yieldable means having a relatively limited yieldable movement.

7. A wing for aircraft comprising a pair of sections hinged together adjacent their top, a bulkhead rigidly secured to each section and extending substantially perpendicularly to said wing, a resilient element between the bulkheads to limit their movement upwards each other and means to limit the movement of said bulkheads away from each other and the wing sections of which they form a part.

8. A wing for aircraft comprising sections hinged together under their top post, bulkheads on the aforesaid sections, pins extending through said bulkheads, yieldable means mounted on said pins between said bulkheads and additional yieldable means on said pins on the outer side of each bulkhead whereby movement of the bulkheads is limited.

In testimony whereof, I have signed my name to this specification this 18th day of July, 1927.

EDMUND B. CARNS.